United States Patent
Haugwitz et al.

[15] 3,678,066
[45] July 18, 1972

[54] THIOCYANIC ACID ESTERS

[72] Inventors: Rudiger D. Haugwitz, Highland Park; Venkatachala Lakshmi, North Brunswick, both of N.J.

[73] Assignee: E. R. Squibb & Sons, Inc., Princeton, N.J.

[22] Filed: March 6, 1970

[21] Appl. No.: 17,320

[52] U.S. Cl. .......................................... 260/309.2, 424/273
[51] Int. Cl. ........................................................ C07d 49/38
[58] Field of Search ................................................. 260/309.2

[56] References Cited

UNITED STATES PATENTS

| | | | |
|---|---|---|---|
| 2,394,915 | 2/1946 | Jones | 260/454 |
| 3,463,785 | 8/1969 | Buckman et al. | 260/309.2 |

FOREIGN PATENTS OR APPLICATIONS

| | | | |
|---|---|---|---|
| 6,609,552 | 1/1967 | Netherlands | 260/309 |
| 1,814,335 | 8/1969 | Germany | 260/309 |

OTHER PUBLICATIONS

Merck Chem. Abst. Vol. 67, No. 54123u (1967). QD1.A51
Moszew et al. Chem. Abst. Vol. 67, No. 2924m (1967). QD1.A51
Lowenbein et al. Chem. Abst. Vol. 24, page 5296 (1930). QD1.A51
Kottke et al. Chem. Abst. Vol. 68, No. 21884K (1968). QD.A51
Heslop et al. Inorganic Chemistry 3rd, rev. ed. pages 308 and 321 N.Y., Elsevier, 1967. QD151.H47
Latimer et al. Reference Book of Inorganic Chemistry, rev. ed. pages 36 and 57 N.Y., Macmillan, 1940. QD151.L3

*Primary Examiner*—Natalie Trousoe
*Attorney*—Lawrence S. Levinson, Merle J. Smith, Theodore J. Criares, Donald J. Perrella and Burton Rodney

[57] ABSTRACT

Disclosed herein are thiocyanic acid esters of benzimidazoles which have utility as parasiticides and anti-inflammatory agents.

5 Claims, No Drawings

THIOCYANIC ACID ESTERS

SUMMARY OF INVENTION

This invention relates to thiocyanic acid esters of benzimidazoles having the formula:

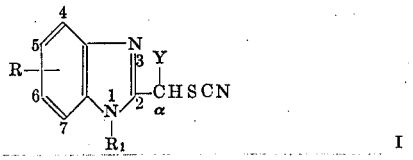
I wherein R is hydrogen, alkyl, alkoxy, halo, nitro, hydroxy, amino, alkylamino, dialkylamino, cyano, or mercapto; $R_1$ is hydrogen, alkyl or phenyl; and Y is hydrogen, alkyl, or phenyl.

The term "alkyl" as utilized herein represents straight and branched chain hydrocarbons having from one to about six carbons, for example, methyl, ethyl, propyl, isopropyl, butyl, isobutyl, and so forth; phenyl represents substituted and unsubstituted phenyl, such as o-methylphenyl, p-propylphenyl, o-chlorophenyl, o-methyl-p-bromophenyl, and so forth; halo is fluoro, chloro, bromo or iodo; alkylamino is, for example, isopropyl amino and so forth. The preferred compounds of this invention are those wherein R is hydrogen, nitro or halo; $R_1$ is hydrogen, lower alkyl or unsubstituted phenyl and Y is lower alkyl.

The compounds of this invention can be utilized as parasiticides and rodenticides, being particularly useful against *Crithidia fasciculata*. These compounds when utilized as parasiticides form the active ingredient in feed stuffs for cattle, hogs and chickens, being admixed with said feed stock in from 0.1 to 25 mg. per 100 pounds weight of feed stuffs with the most preferred range being from about 5 to 10 mg. per 100 pounds of feed stuff.

As anti-inflammatory agents, the compounds of this invention may be used topically in lieu of and in the same manner as cortisone in the treatment of acute inflammatory and allergic conditions of the eye, skin or mucosa, e.g., as suspension, ointment or cream containing about 0.1 to about 2.5 percent, by weight, of a compound of formula IV or salt thereof. In the rabbit or cow, for example, a 1 percent ointment is applied to the skin area 3 to 4 times daily.

The compounds of this invention can be prepared by reacting a haloalkyl benzimidazole of formula II:

II wherein R, $R_1$ and Y are as herein described and X is Cl, Br or I, with a salt of thiocyanic acid, such as ammonium thiocyanate; alkali metal thiocyanate, (e.g., potassium thiocyanate or sodium thiocyanate) or an alkaline earth metal thiocyanate, (e.g., barium thiocyanate or calcium thiocyanate). The reagents can be reacted in stoichiometric amounts; however, it may be desirable to utilize an excess of the thiocyanate salt in the reaction to make it go to completion. The process is carried out in the presence of protic or aprotic solvents, such as: methanol, butanol, acetone, dimethylformamide, dimethyl sulfoxide. Temperatures of from between about 0° and about 158° C., depending on the solvent utilized have been found operable. It is preferred to utilize from 0° to 50° temperatures when carrying out the process of this invention. This reaction yields the desired compounds of formula I:

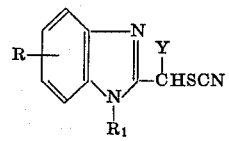

wherein R, $R_1$ and Y are as defined herein.

The haloalkyl benzimidazole compounds of formula II are well known to the art and can be prepared by methods known to the art, such as by reacting an o-phenylenediamine of formula III with α-haloalkanoic acid of formula IV or its anhydride to yield the desired haloalkyl benzimidazole as indicated in the following equation:

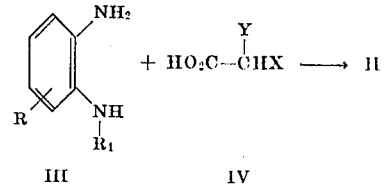

wherein R, $R_1$, X and Y are as defined herein.

This reaction is preferably carried out in acid medium, such as dilute hydrochloric acid. It follows the procedure set forth in Journal of the Chemical Society, 1928, page 2393, and is generally referred to as "Phillips' Benzimidazole Synthesis."

Alternatively, the products of this invention may be prepared by the interaction of sulfhydryl alkyl benzimidazole of formula V:

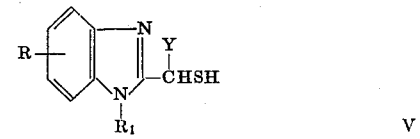
V wherein R, $R_1$ and Y are as defined herein; with a cyanogen halide of formula CNX, as for example, bromocyanogen or chlorocyanogen.

The reaction is carried out in the presence of an organic solvent system. Solvents which may be utilized are aliphatic and aromatic hydrocarbons (e.g., hexane, ligroin, benzene, toluene, and so forth); halogenated hydrocarbons (e.g., carbontetrachloride, o-chlorobenzene, ethylene chloride, and so forth); esters (e.g., ethyl acetate, and so forth); and ethers or ketones (e.g., acetone, ethyl ether, and so forth). Temperatures of from about −15° C. to about 60° C. with the most preferred temperature range being from about −10° to about 50° C.

Reagents that may be utilized in the practice of this invention are as follows:

HALOALKYL BENZIMIDAZOLES

2-Chloromethyl benzimidazole; 2-bromomethyl-5-fluorobenzimidazole; 2-chloromethyl-5-(or 6 ) nitrobenzimidazole; 2-chloromethyl-4-cyanobenzimidazole; 2-chloromethyl-1-methyl-benzimidazole; 2-chloromethyl-5- (or 6 ) chlorobenzimidazole, 2-bromomethyl-5,6-diaminobenzimidazole; 2-bromomethyl-7-mercaptobenzimidazole; α-methyl-2-chloromethylbenzimidazole; and α-isopropyl-2-chloromethyl-5-hydroxybenzimidazole.

O-PHENYLENEDIAMINES

4-Nitrophenylenediamine; 4-methylphenylenediamine; 4,5-dimethylphenylenediamine; N-methylphenylenediamine; N-methyl-3-hydroxyphenylenediamine; N-methyl-4-chlorophenylenediamine; 3-cyanophenylenediamine; 4-methoxyphenylenediamine; and 4-isopropylphenylenediamine.

α-HALOALKANOIC ACIDS

Chloroacetic acid; 1-bromoproionic acid; 1-chlorobutanoic acid; and α-isopropylchloroacetic acid.

SULFHYDRYLALKYL BENZIMIDAZOLES

2-Sulfhydrylmethylbenzimidazole; α-methyl-2-sulfhydrylmethylbenzimidazole; 2-sulfhydrylmethyl-5-nitrobenzimidazole; 2-sulfhydrylmethyl-5-chlorobenzimidazole; 2-sulfhydrylmethyl-5-methylbenzimidazole;α-ethyl-2-sulfhydrylmethyl-4-hydroxybenzimidazole; 2-sulfhydrylmethyl-4-hydroxybenzimidazole; 2-sulfhydrylmethyl-5-cyanobenzimidazole; 1-methyl-2-sulfhydrylmethylbenzimidazole; 1-methyl-2-sulfhydrylmethyl-5-methoxybenzimidazole; 1-phenyl-2-sulfhydrylmethyl-5-aminobenzimidazole; and 2-sulfhydrylmethyl-5-mercaptobenzimidazole.

The following examples are illustrative of the invention, all temperatures are in degrees Centigrade, unless otherwise set forth.

Due to the nature of the compounds it is to be understood that in the examples to follow wherein the $N_1$-nitrogen bears no substituent, the ring positions 5 and 6, as well as 4 and 7 become equivalent, i.e., 5-substitution means either 5 or 6 and 4-substitution means either 4 or 7.

EXAMPLE 1

Thiocyanic Acid, 2-Benzimidazoyl Methyl Ester

A solution of 8.4 g. of ammonium thiocyanate in 68 ml. of dimethylsulfoxide is treated with 9 g. of 2-chloromethylbenzimidazole and the clear solution is stirred for about 15 hours at about ambient temperature, adding water until no further precipitate formed at the end of this time. The solid is filtered, washed with water, dissolved in dimethylsulfoxide and reprecipitated with water. This reprecipitating process is repeated. Upon drying at 25° C. under a vacuum of 0.01 mm/Hg 4.2 g. of analytically pure ester is obtained, m.p. 153°–154°.

Anal.
Calc'd for $C_9H_7N_3S$: C, 57.20; H, 3.73; N, 22.23
Found: C, 57.10; H, 3.86; N, 21.96

EXAMPLE 2

Thiocyanic Acid, (5-chloro-2-benzimidazoyl) Methyl Ester

To a solution of 25 g. of ammonium thiocyanate in 125 ml. of dimethylsulfoxide at 0° C., there is added 9.8 g. of 5-chloro-2-chloro methyl benzimidazole. The solution is kept at 0° for about 6 hours after which water is added until no further precipitate is formed. After filtration the solid is dried and recrystallized from chloroform-petroleum ether (BP 30°–60°) yield: 4.0 g.; m.p. 125°–128°.

Anal.
Calc'd for $C_9H_6ClN_3S$: C, 48.33; H, 2.70; N, 18.78
Found: C, 48.28; H, 2.98; N, 18.50

EXAMPLE 3

Thiocyanic Acid, (1-Methyl-2-Benzimidazoyl)Methyl Ester the Recrystallization

A solution of 13.3 g. of ammonium thiocyanate and 8 g. of 1-methyl-2-chloromethyl benzimidazole in 60 ml. of dimethylsulfoxide is stirred at room temperature for 22 hours, after which water is added to precipitate the product. Recrystallization of the dried solid from chloroform-ethyl ether furnished 5.4 g. of analytically pure product, m.p. 136°–138°.

Anal.
Calc'd for $C_{10}H_9N_3S$: C, 59.09; H, 4.47; N, 20.67
Found: C, 58.80; H, 4.53; N, 20.36

EXAMPLE 4

Thiocyanic Acid, (1,5-dimethyl-2-benzimidazoyl) Methyl Ester

Utilizing the procedure of Example 1 but substituting 1.5-dimethyl-2-bromomethylbenzimidazole for 2-chloromethylbenzimidazole, the product recovered is thiocyanic acid (1,5-dimethyl-2-benzimidazoyl)methyl ester.

EXAMPLE 5

Thiocyanic Acid, (2-benzimidazoyl-α-methyl)Methyl Ester

Utilizing the procedure of Example 1 but substituting α-methyl-2-chloromethylbenzimidazole for 2-chloromethylbenzimidazole, the product recovered is thiocyanic acid,(2-benzimidazoyl-α-methyl)-methyl ester.

EXAMPLE 6

Thiocyanic Acid-(1-phenyl-5-nitro-2-benzimidazoyl)-α-propyl Methyl Ester

Utilizing the procedure of Example 1 but substituting 1-phenyl-5-nitro-α-propyl-2-chloromethylbenzimidazole for 2-chloromethylbenzimidazole, the product recovered is thiocyanic acid-(1-phenyl-5-nitro-2-benzimidazoyl)-α-propyl methyl ester.

EXAMPLE 7

Thiocyanic Acid-(1-o-chlorophenyl-5-methoxy-2-benzimidazoyl-α-chlorophenyl)-Methyl Ester Utilizing the procedure of Example 1 but substituting 1-o-chlorophenyl-5-methoxy-α-o-chlorophenyl-2-chloromethylbenzimidazole for 2-chloromethylbenzimidazole, the product recovered is thiocyanic acid -(1-o-chlorophenyl-5-methoxy-2-benzimidazoyl-α-chlorophenyl)methyl ester.

EXAMPLE 8

Following the procedure of Example 1 but utilizing the compounds illustrated in Column A in lieu of 2-chloromethyl benzimidazole and substituting sodium thiocyanate for ammonium thiocyanate, the product formed has the structure of Column B:

Column A 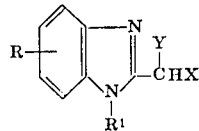         Column B 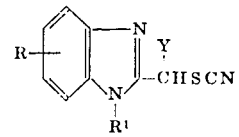

| Example | A | B |
|---|---|---|
| 8 | R=$C_3H_7$; R¹=butyl; X=bromo; Y=O-nitrophenyl | R=propyl; R¹=butyl; Y=O-nitrophenyl |
| 9 | R=5-hydroxy; R¹=O-aminophenyl; Y=O-aminophenyl; X=iodo | R=5-hydroxy; R¹=O-aminophenyl; Y=O-aminophenyl |
| 10 | R=5-diheptylamino; R¹=isopropyl; Y=butyl; X=chloro | R=5-diheptylamino; R¹=isopropyl; Y=butyl |
| 11 | R=5-mercapto; R¹=2,3-dichlorophenyl; Y=isopropyl; X=bromo | R=5-mercapto; R¹=2,3-dichlorophenyl; Y=isopropyl |

EXAMPLE 12

Thiocyanic Acid, (5-nitro-2-Benzimidazoyl)Methyl Ester

To a solution of 3.5 g. of ammonium thiocyanate in 30 ml. of dimethylsulfoxide, there is added 3.8 g. of 2-chloromethyl-5-nitrobenzimidazole. The solution is kept at room temperature overnight, after which water is added to precipitate the product. Two crystallizations from methanol-petroleum ether (BP 30°–60°) furnished 2.8 g. of pure product. m.p. 167°–69°.

Anal.
Calc'd for $C_9H_6N_4O_2S$: C, 46.15; H, 2.58; N, 23.92
Found: C, 46.09; H 2.63; N, 23.74

What is claimed is:
1. A thiocyanic acid ester having the formula

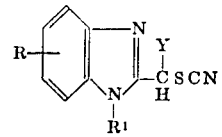

wherein R is hydrogen, alkyl, alkoxy, halo, nitro, hydroxy, amino, alkylamino, dialkylamino, cyano or mercapto; $R_1$ is hydrogen, alkyl, phenyl, alkylphenyl or halophenyl; and Y is hydrogen, alkyl, phenyl, alkylphenyl or halophenyl; each of said alkyl and alkoxy groups having one to six carbons.

2. A compound in accordance with claim 1 having the name thiocyanic acid, 2-benzimidazoyl methyl ester.

3. A compound in accordance with claim 1 having the name thiocyanic acid (5-chloro-2-benzimidazoyl)methyl ester.

4. A compound in accordance with claim 1 having the name thiocyanic acid, (1-methyl-2-benzimidazoyl)methyl ester.

5. A compound in accordance with claim 1 having the name thiocyanic acid (5-nitro-2-benzimidazoyl)methyl ester.

* * * * *

PO-1050
(5/69)

UNITED STATES PATENT OFFICE
CERTIFICATE OF CORRECTION

Patent No. 3,678,066          Dated July 18, 1972

Inventor(s) Rudiger D. Haugwitz, and Venkatachala Lakshmi Narayanan

It is certified that error appears in the above-identified patent and that said Letters Patent are hereby corrected as shown below:

In the listing for inventors:

"Venkatachala Lakshmi" should read as follows --

-- Venkatachala Lakshmi Narayanan --.

Column 3, line 1, omit the following:
"2-sulfhydrylmethyl-4-hydroxy-benzimidazole;".

Column 3, line 50, omit the following:
"the Recrystallization".

Signed and sealed this 17th day of April 1973.

(SEAL)
Attest:

EDWARD M. FLETCHER, JR.          ROBERT GOTTSCHALK
Attesting Officer                Commissioner of Patents